United States Patent
Hall et al.

(10) Patent No.: US 7,827,669 B2
(45) Date of Patent: Nov. 9, 2010

(54) DRILL GUIDE

(75) Inventors: Timothy David Hall, Bristol (GB); Brian John Turner, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 12/382,264

(22) Filed: Mar. 12, 2009

(65) Prior Publication Data

US 2009/0269132 A1 Oct. 29, 2009

(30) Foreign Application Priority Data

Apr. 23, 2008 (GB) .................................. 0807390.0

(51) Int. Cl.
*B23P 11/00* (2006.01)
(52) U.S. Cl. .............. 29/525.02; 29/525.11; 29/525.01; 408/115 R; 408/1 R; 403/319
(58) Field of Classification Search ................. 408/1 R, 408/115 R, 72 B; 29/525.01–525.03, 525.11; 403/317–319
See application file for complete search history.

(56) References Cited

U.S. PATENT DOCUMENTS

| 5,415,502 | A | * | 5/1995 | Dahlin ...................... 408/72 B |
| 5,707,375 | A | * | 1/1998 | Durham et al. ................ 606/98 |
| 7,003,860 | B2 | * | 2/2006 | Bloch et al. ................. 29/407.1 |

FOREIGN PATENT DOCUMENTS

GB 672036 5/1952

JP 1-121113 5/1989

OTHER PUBLICATIONS

UK Search Report for Great Britain Application No. 0807390.0, dated Aug. 14, 2008.

* cited by examiner

*Primary Examiner*—David P Bryant
*Assistant Examiner*—Bayan Salone
(74) *Attorney, Agent, or Firm*—Nixon & Vanderhye P.C.

(57) ABSTRACT

A method of joining together a first and second workpieces. The method comprises; drilling a first hole at least partially through the first workpiece with a drill bit oriented in a first direction; drilling a second hole at least partially through the first workpiece with a drill bit oriented in a second direction which is not parallel with the first direction, the drill bit passing through the first workpiece into a side of the first hole; inserting a fastener through the second workpiece and into the first hole; inserting an anchor into the first hole via the second hole; and securing the fastener within the first hole with the anchor. The invention also relates to a drill guide for use in such a method.

The drill bit is aligned by placing a target magnet in the first hole without completely filling it; placing a drill guide with a guide magnet or magnetic field sensor next to the first workpiece; adjusting the position of the drill guide until the guide magnet or magnetic field sensor indicates that the drill guide is aligned with the target magnet; and drilling the second hole by passing the drill bit through the drill guide and at least partially through the first workpiece, the drill bit entering the side of the first hole at a location where the first hole is not filled by the target magnet.

9 Claims, 10 Drawing Sheets

DRILL GUIDE

This application claims priority to Great Britain Patent Application No. 0807390.0, filed 23 Apr. 2008, the entire content of which is hereby incorporated by reference.

FIELD OF THE INVENTION

The present invention relates to a method of joining together a first and second workpieces. In particular, the method comprises drilling a first hole at least partially through the first workpiece with a drill bit oriented in a first direction; drilling a second hole at least partially through the first workpiece with a drill bit oriented in a second direction which is not parallel with the first direction, the drill bit passing through the first workpiece into a side of the first hole; inserting a fastener through the second workpiece and into the first hole; inserting an anchor into the first hole via the second hole; and securing the fastener within the first hole with the anchor. The invention also relates to a drill guide for use in such a method.

BACKGROUND OF THE INVENTION

A problem with such a method is how to align the drill bit correctly so that the drill bit enters the first hole at the correct position as it drills the second hole. One solution to this problem would be to provide a drill guide which is inserted into the first hole. However this may not be possible with the second workpiece in place.

SUMMARY OF THE INVENTION

A first aspect of the invention provides a method of aligning the drill bit during the drilling of the second hole. The method comprises placing a target magnet in the first hole without completely filling it; placing a drill guide with a guide magnet or magnetic field sensor next to the first workpiece; adjusting the position of the drill guide until the guide magnet or magnetic field sensor indicates that the drill guide is aligned with the target magnet; and drilling the second hole by passing the drill bit through the drill guide and at least partially through the first workpiece, the drill bit entering the side of the first hole at a location where the first hole is not filled by the target magnet.

The drill guide may comprise a guide magnet or a magnetic field sensor such as a Hall-effect sensor. Where a magnetic field sensor is used, then the sensor gives an output reading which indicates the strength of the magnetic field and hence reaches a maximum when the drill guide is aligned as required. Where a guide magnet is used, then the magnet will experience an attractive force which reaches a maximum when the drill guide is aligned, and thus provides an indication that the drill guide is aligned. In this case the drill guide may be "self-aligning" in the sense that the attractive force tends to move the drill guide towards the aligned position. Alternatively, if frictional forces between the drill guide and the first workpiece prevent such "self-aligning" operation then the drill guide may be adjusted into position manually, with the attractive force giving a tactile indication to an operator when the drill guide is aligned.

In the case where a guide magnet is used, then this may comprise a permanently magnetised magnetic material such as Neodynium Iron Boron, or an electromagnet. An electromagnet may be used where a high field strength is required, but is generally less preferred due to the requirement of wires to power the magnet.

Similarly, the target magnet may comprise an electromagnet but more preferably it comprises a permanently magnetised magnetic material such as Neodynium Iron Boron.

Typically the target magnet and/or the guide magnet is oriented with its north-south axis substantially parallel with the first direction.

The coupling between the anchor and the fastener may take a number of different forms. For instance the anchor may have a threaded hole into which the fastener is screwed to secure the fastener in place. Alternatively the fastener may comprise an anchor hole and the fastener is secured by inserting the anchor into the anchor hole.

The first hole and/or the second hole may be open at both ends, or may be blind holes open at one end only.

A second aspect of the invention provides a drill guide comprising a guide magnet with a north-south axis oriented in a first direction; and a guide hole oriented in a second direction which is not parallel with the first direction. Such a drill guide is particularly suited for use in the method of the first aspect of the invention.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
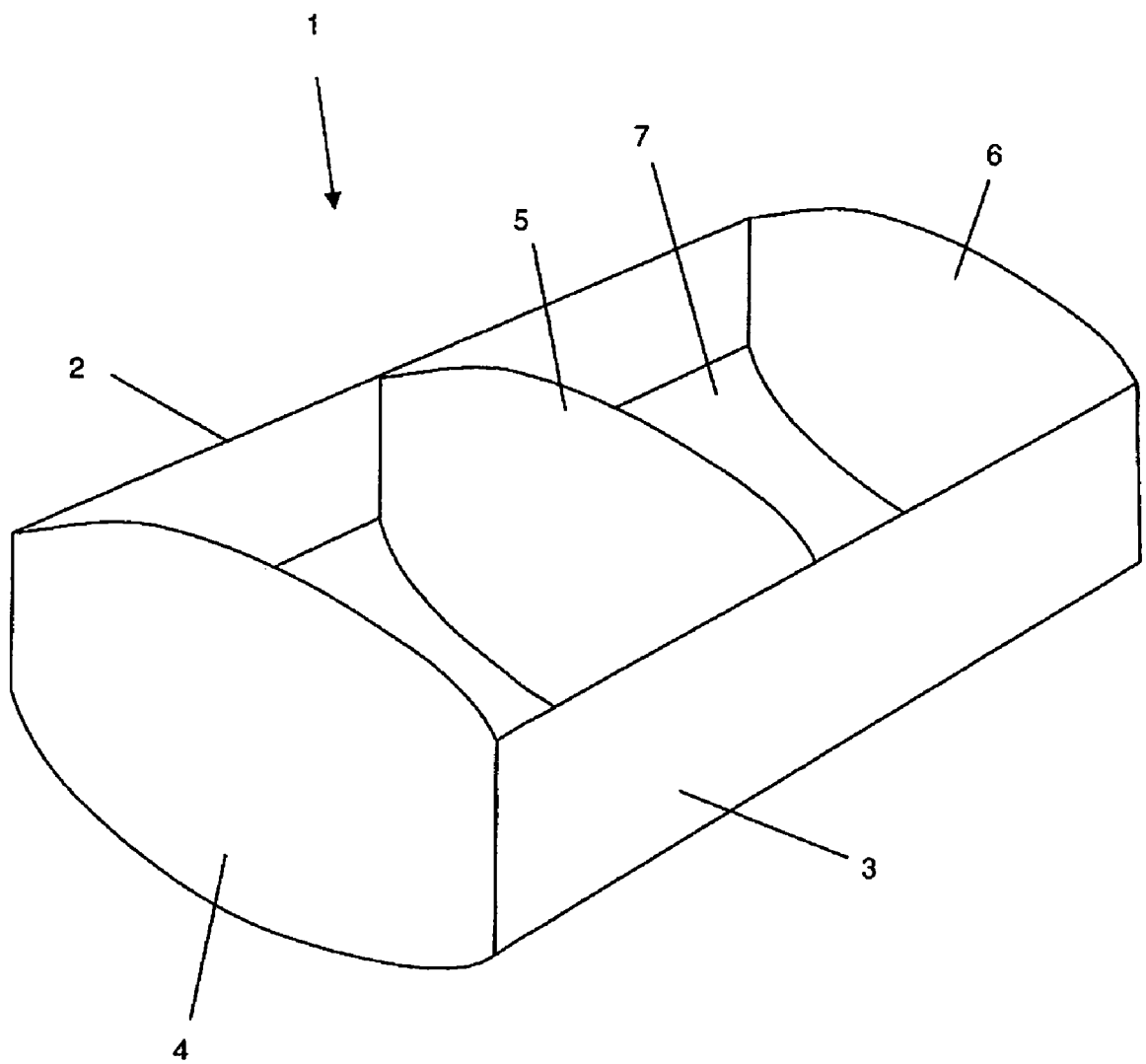
FIG. 1 is a perspective view showing part of a wing box.

FIG. 1 is a schematic view of part of a wing box 1, which is the primary structural element of an aircraft wing. The wing box 1 comprises spars 2, 3 running in a spanwise direction; ribs running in a chordwise direction between the spars 2, 3; and upper and lower skins which are attached to the spars and to the upper and lower edges of the ribs 4-6. In FIG. 1 only the lower skin 7 is shown, and only three ribs 4-6.

FIGS. 2-9 shows various steps in a method of joining together the rib 5 and the skin 7. The rib 5 and skin 7 are both formed from laminar composite materials, such as carbon-fibre reinforced epoxy resin. The plies of composite material are shown in FIGS. 2-9 running vertically in the rib 5 and horizontally in the skin 7. A number of joints of the kind shown in FIGS. 2-9 are formed along the interface between the rib 5 and the skin 7.

Figure 2:
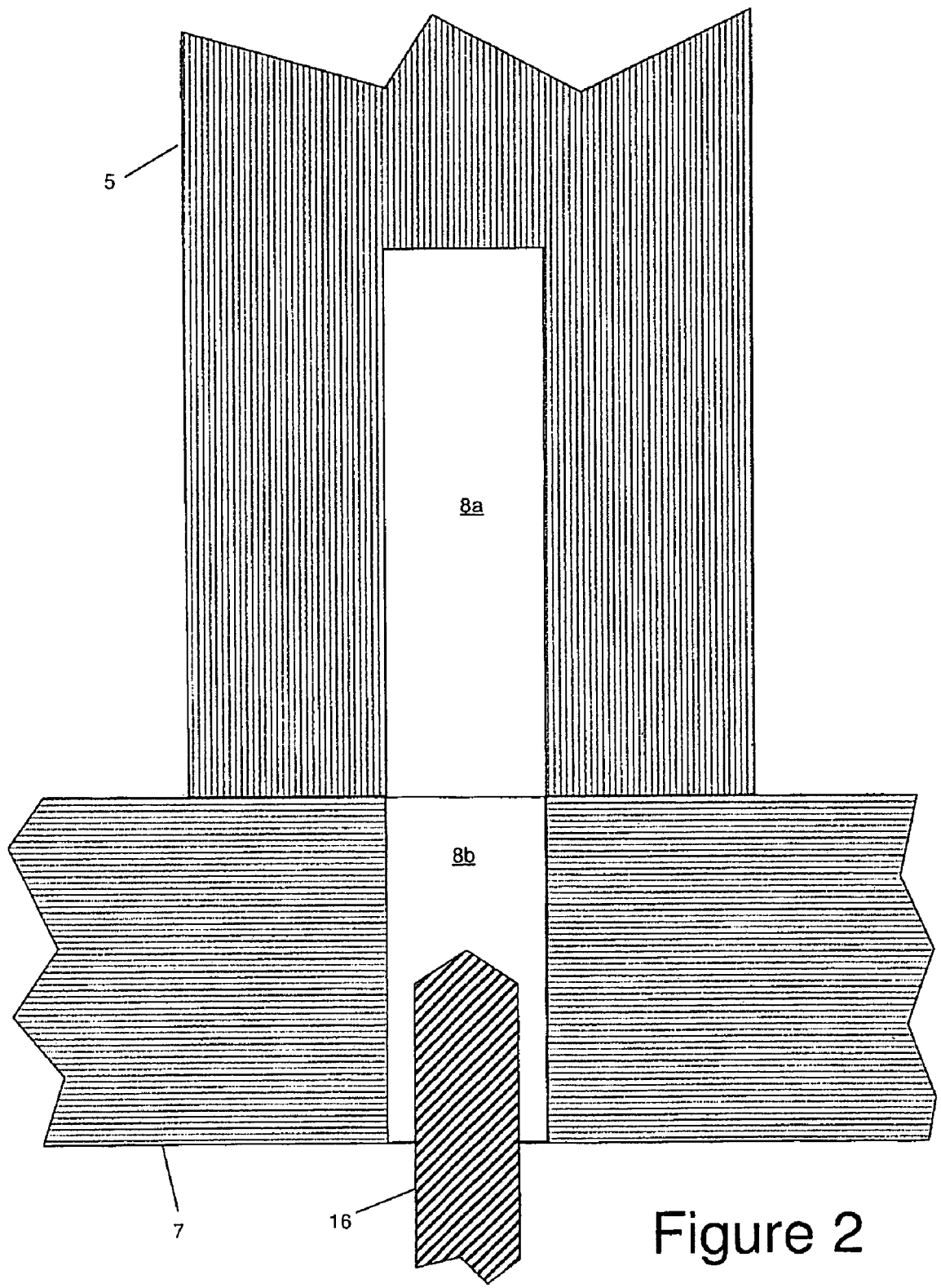
FIGS. 2-9 are schematic cross-sectional views showing various steps in the formation of a joint between a rib and skin of the wing box of FIG. 1.

First, a drill bit 16 shown in FIG. 2 oriented perpendicular to the outer face of the skin is passed through the skin 7 and into the rib 5 to drill a blind hole 8a in the rib 5 and a hole 8b through the skin 7. The axes of the holes 8a, 8b are aligned, coaxial, and approximately vertical.

Figure 3:
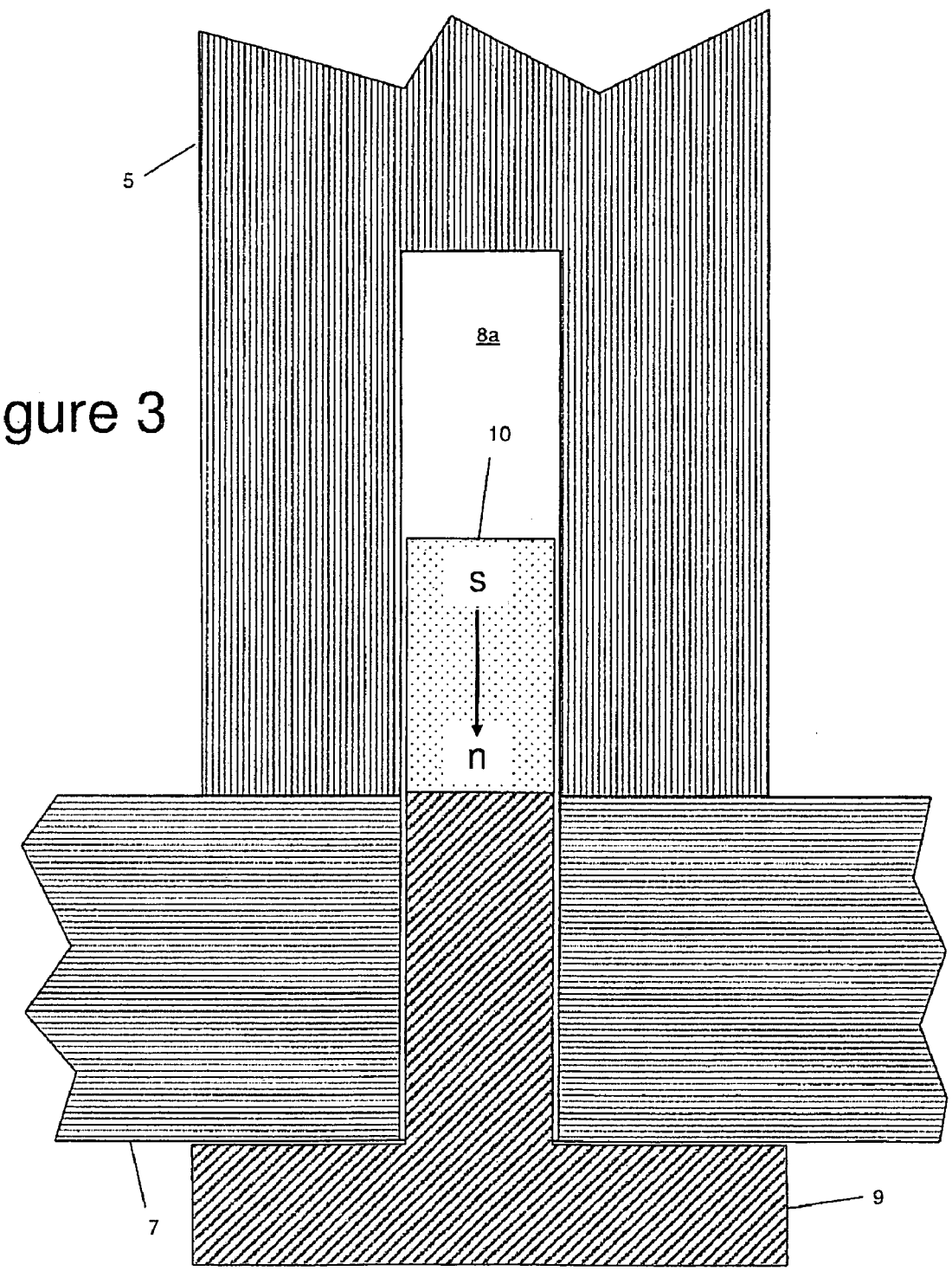

In the next step shown in FIG. 3, a target pin with a head 9 and a shaft with a target magnet 10 at its distal end is pushed into the holes 8a, 8b until the head 9 engages the outer surface of the skin 7. Note that the length of the shaft is such that the target magnet 10 does not completely fill the first hole 8a.

The target magnet 10 comprises a Neodynium Iron Boron magnet which is permanently magnetised and glued onto the shaft of the target pin with its north-south axis pointing vertically down as shown, or in the opposite direction.

Figure 4:
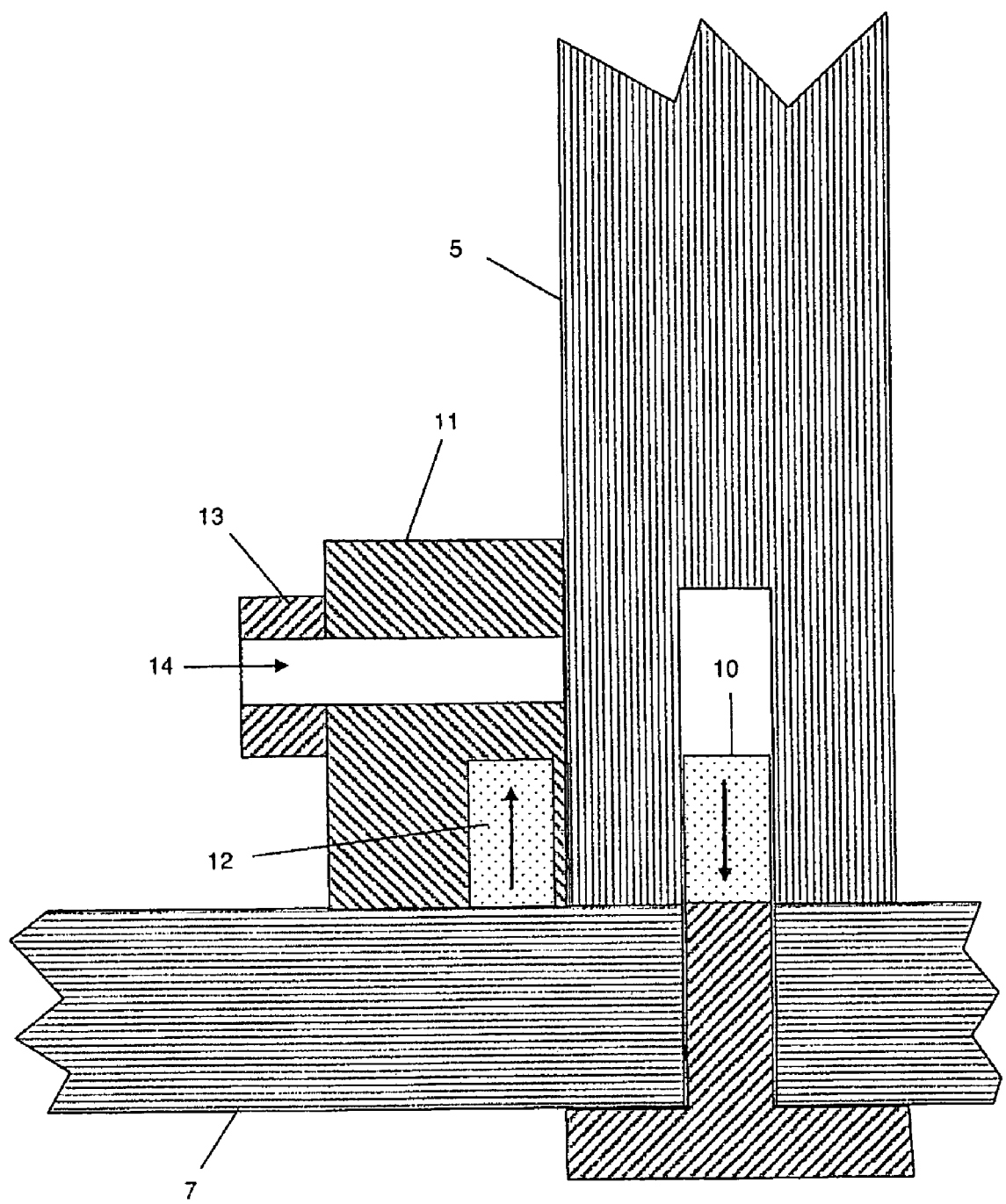

Next, as shown in FIG. 4 a drill guide 11, provided as a kit of parts with the target pin, is placed in the corner where the rib 5 meets the skin 7. The drill guide 11 has a guide magnet 12 with a north-south axis oriented vertically in an opposite direction to the target magnet 10; and a guide hole 14 oriented approximately horizontally. The guide magnet 12 may comprise a Neodynium Iron Boron magnet, or any other permanently magnetised magnetic material. The guide magnet 12 experiences an attractive force which reaches a maximum when it is aligned with the target magnet 10 in the position shown in FIG. 4, and thus provides an indication that the drill guide 11 is aligned. The drill guide 11 may be "self-aligning" in the sense that the attractive force tends to move the drill guide 11 towards the aligned position. Alternatively, if frictional forces between the drill guide and the rib 5 and/or skin 7 prevent such "self-aligning" operation then the drill guide may be adjusted into position manually, with the attractive force giving a tactile indication to the operator when the drill guide is aligned correctly.

Figure 5:
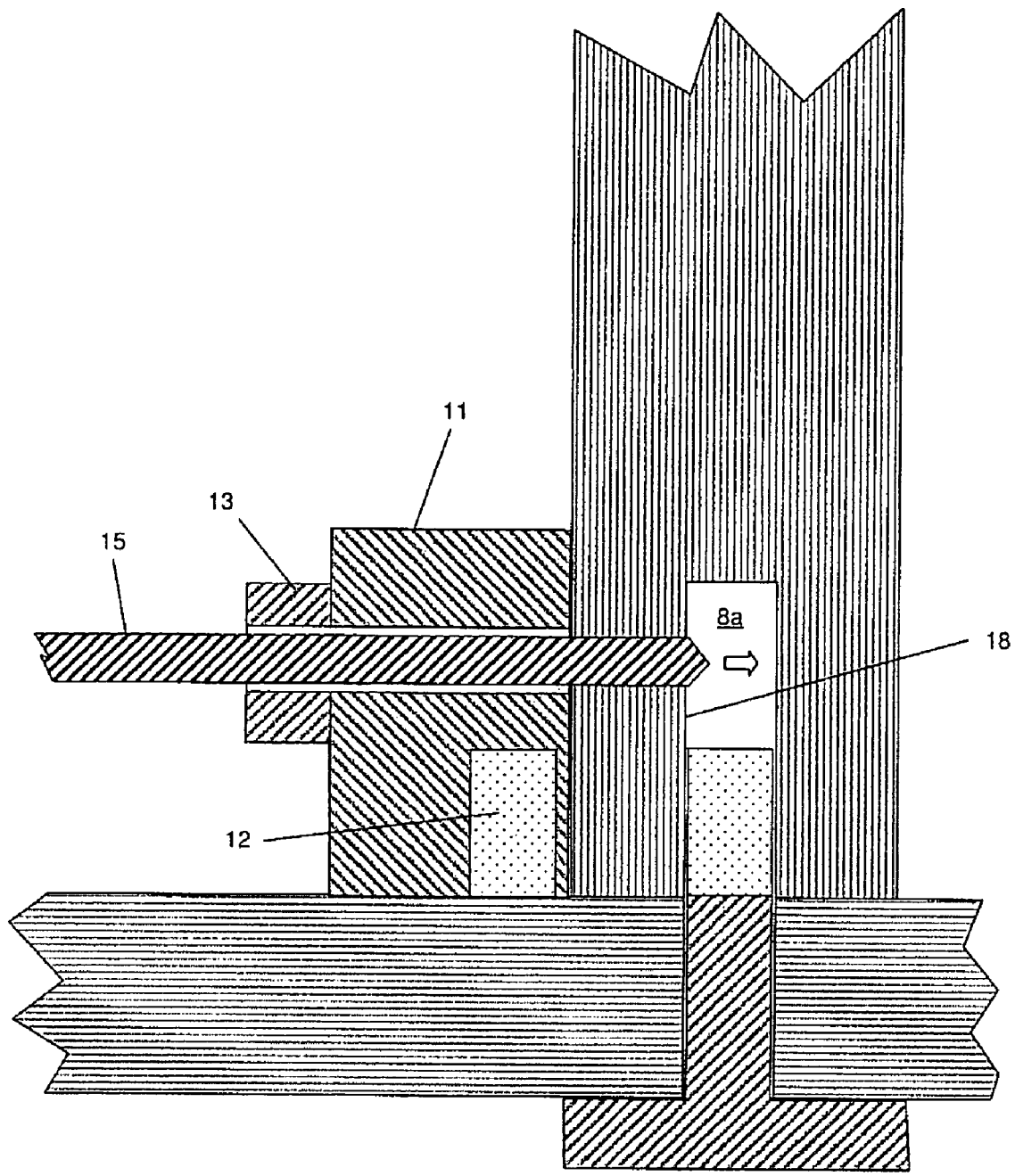
Figure 6:
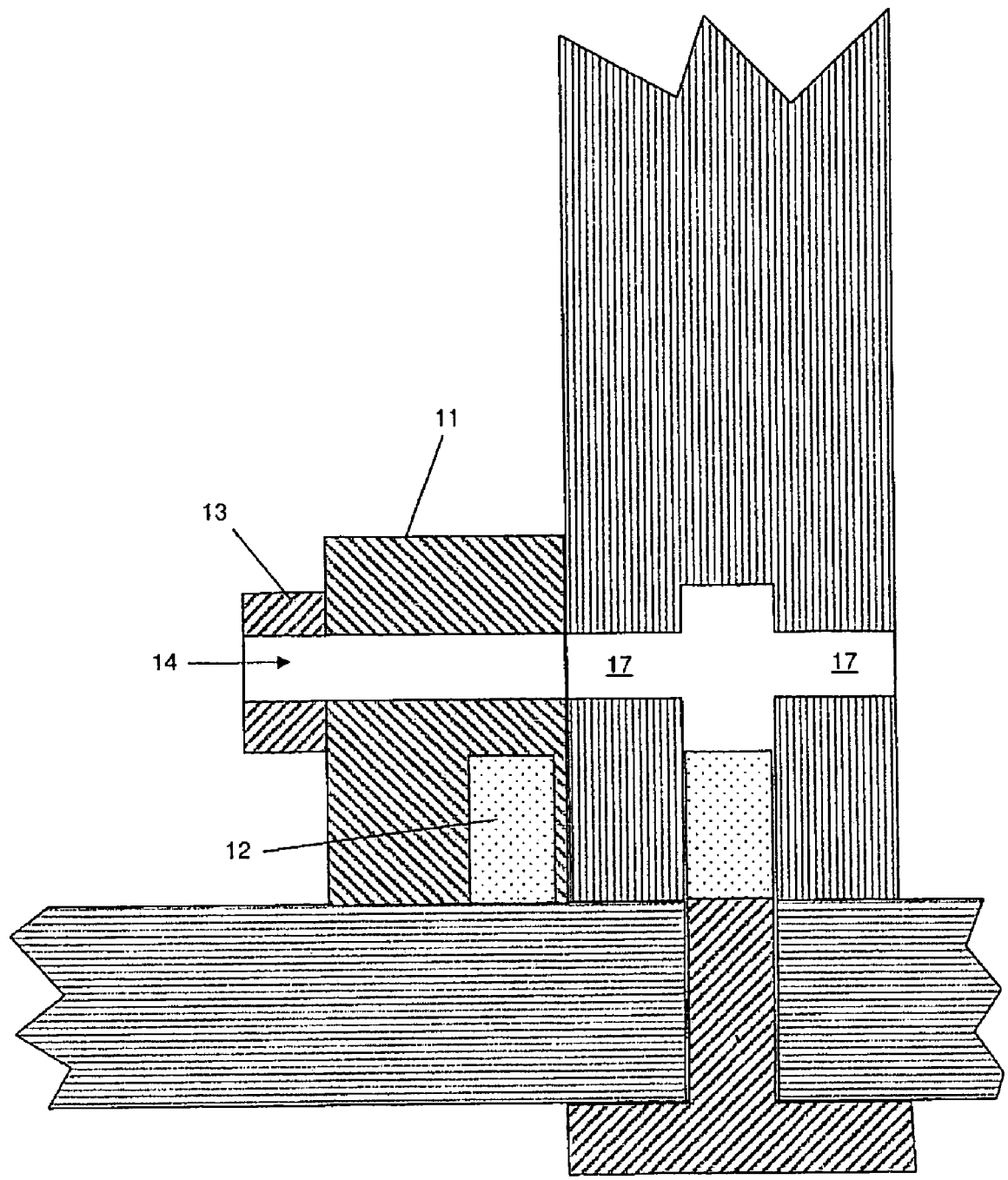

Next, a horizontal hole 17 shown in FIG. 6 is drilled through the rib by passing a drill bit 15 oriented in a horizontal direction as shown in FIG. 5 through the hole 14 in the drill guide 11 and the rib 5. Because the drill guide 11 is correctly aligned, the drill bit 15 enters the side 18 of the vertical hole 8a in the rib at a location where it is not filled by the target magnet 10.

Figure 7:
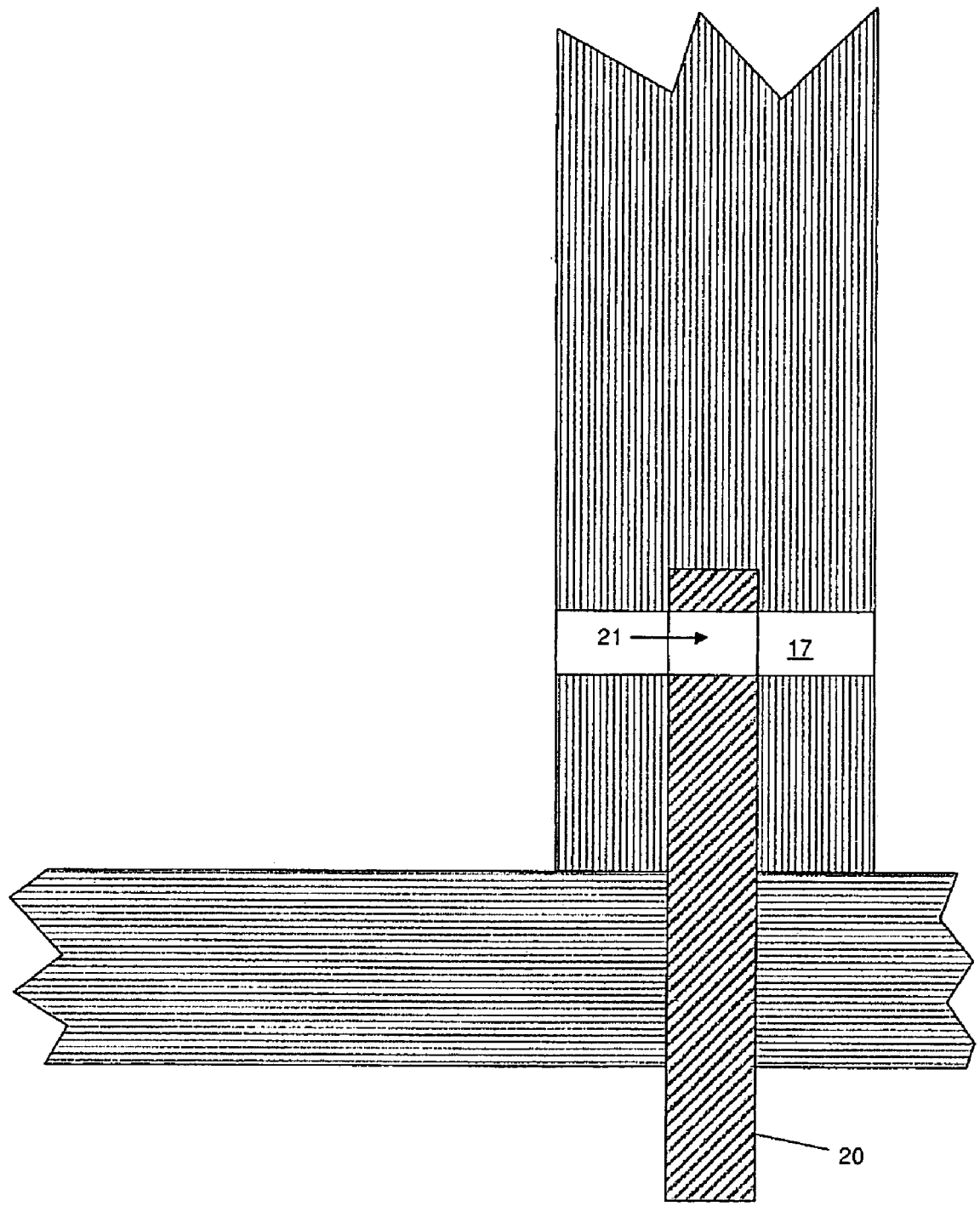

Next, as shown in FIG. 7 the target magnet 10 is removed by pulling on the head 9 of the target pin, the drill bit 15 is removed, and a fastener 20 is inserted into the vertical holes 8a, 8b. The fastener 20 has a hole 21 positioned towards its distal end in line with the horizontal hole 17.

Figure 8:
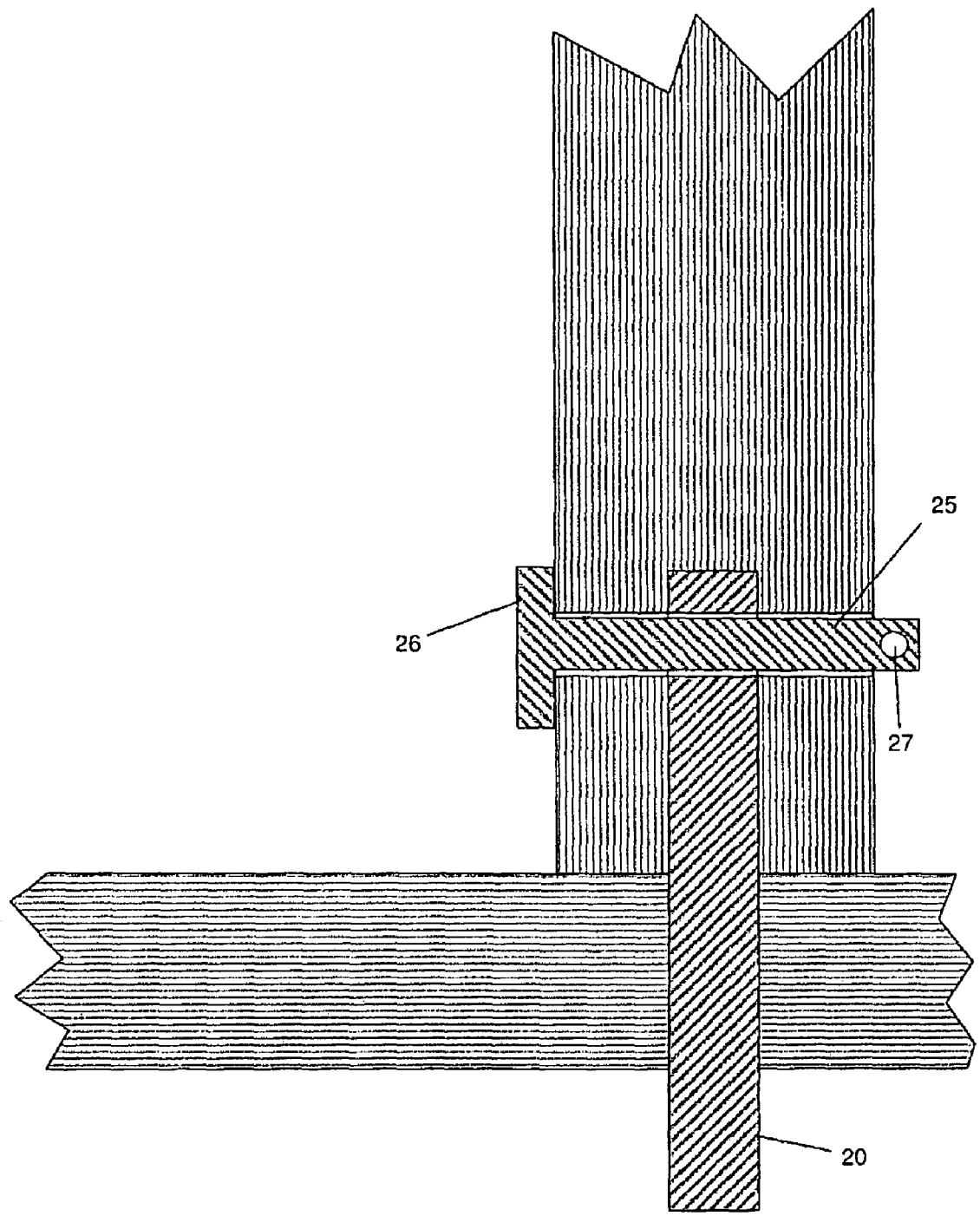

Next, as shown in FIG. 8, an anchor pin 25 is inserted into the horizontal hole 17 and through the hole 21 in the fastener 20 until a head 26 of the anchor pin engages the side of the rib. This secures the fastener 20 in position and prevents it from falling out of the holes 8a, 8b.

Figure 9:
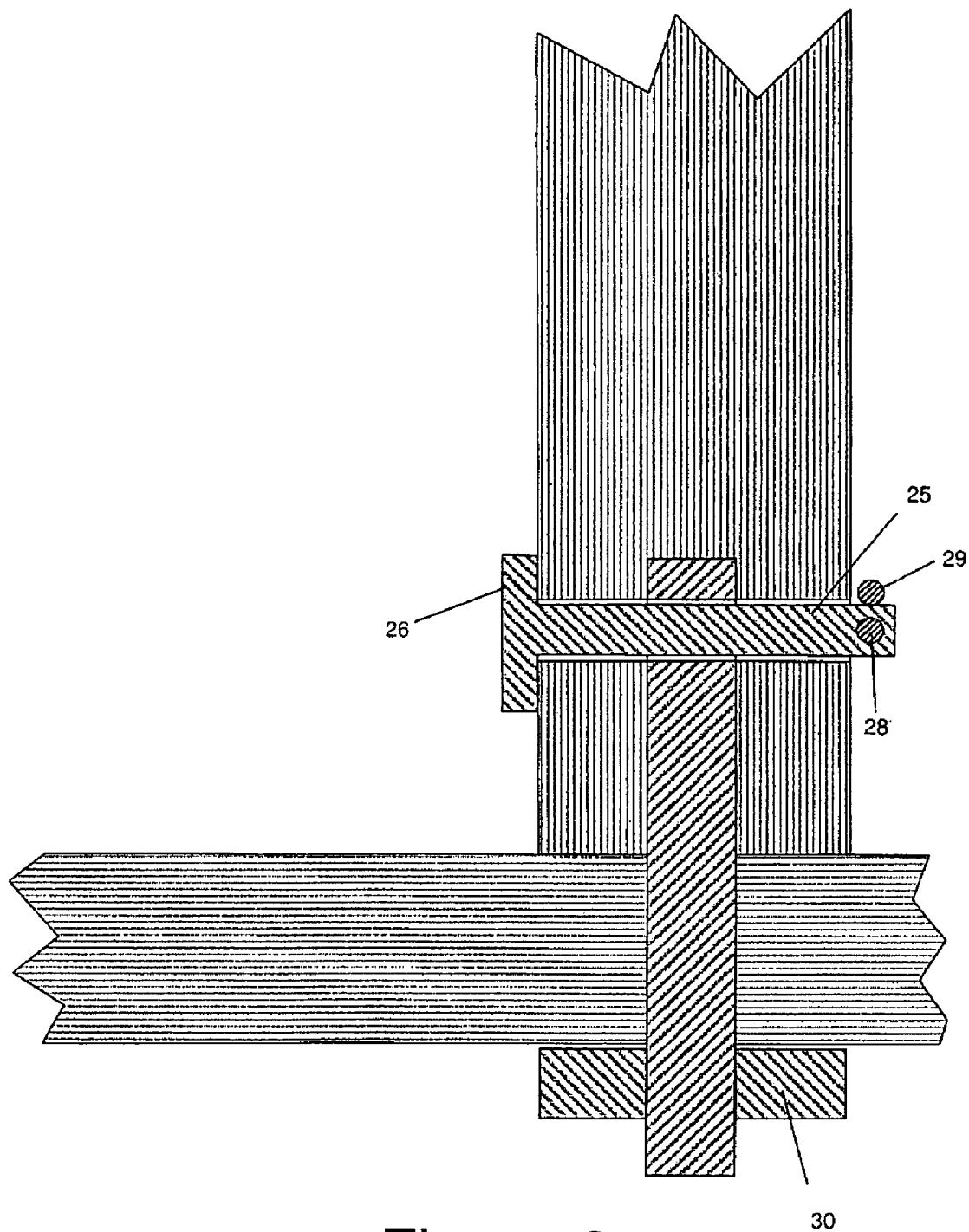
Figure 10:
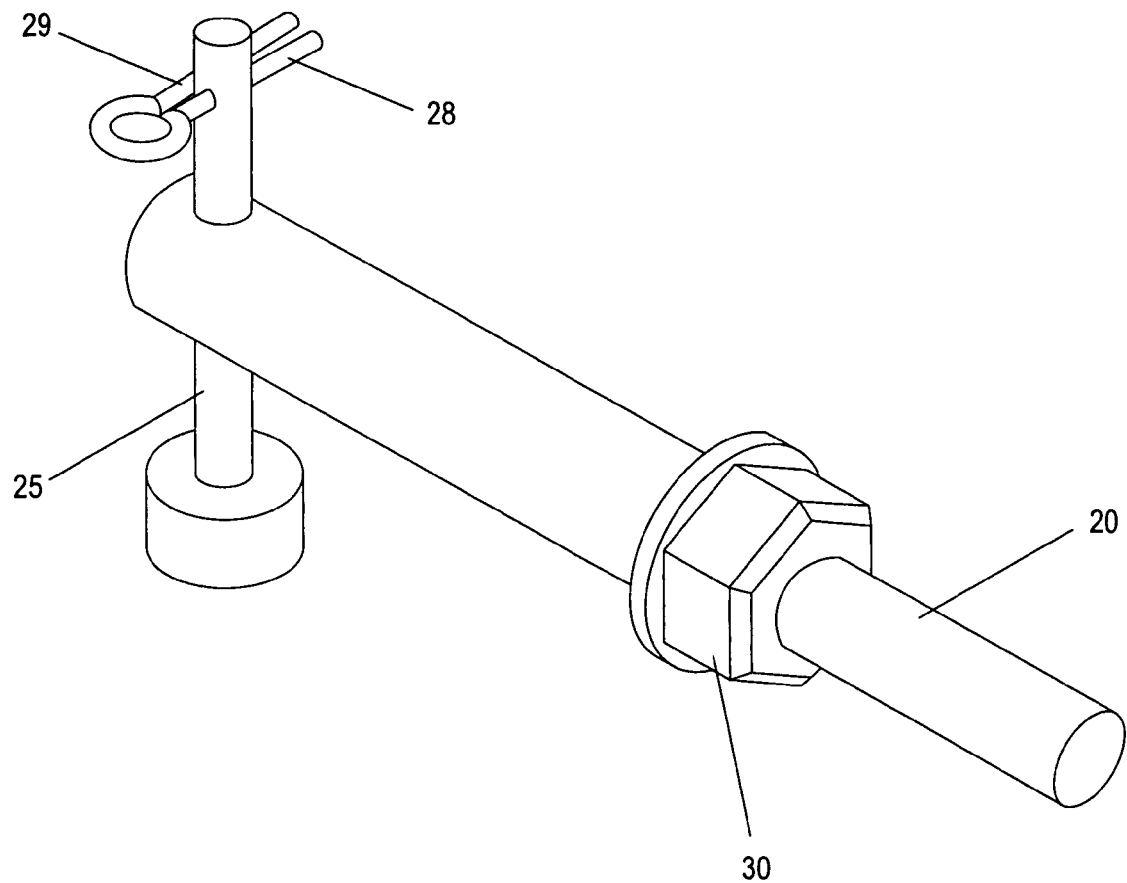
FIG. 10 is a perspective view of a joint formed by the method shown schematically in FIGS. 2-9.

Finally, as shown in FIG. 9, an arm 28 of a split pin is inserted into a hole 27 in the anchor pin 25 to secure the anchor 25 in place; and a nut 30 is threaded onto the fastener 20 and tightened as required. The other arm 29 of the split pin clamps it in place on the anchor pin 25 as shown most clearly in FIG. 10.

The use of the drill guide 11 and target magnet 10 enables the hole 17 to be correctly aligned and drilled without having to remove the skin 7 from the position shown in FIGS. 2-9 in contact with the rib 5.

Although the invention has been described above with reference to one or more preferred embodiments, it will be appreciated that various changes or modifications may be made without departing from the scope of the invention as defined in the appended claims.

The invention claimed is:

1. A method of joining together a first and second workpiece, the method comprising; drilling a first hole at least partially through the first workpiece with a drill bit oriented in a first direction; placing a target magnet in the first hole without completely filling it; placing a drill guide with a guide magnet or magnetic field sensor next to the first workpiece; adjusting the position of the drill guide until the guide magnet or magnetic field sensor indicates that the drill guide is aligned with the target magnet; drilling a second hole at least partially through the first workpiece with a drill bit oriented in a second direction which is not parallel with the first direction, the drill bit passing through the drill guide and through the first workpiece into a side of the first hole at a location where the first hole is not filled by the target magnet; removing the target magnet from the first hole and the drill bit from the second hole; inserting a fastener through the second workpiece and into the first hole; inserting an anchor into the first hole via the second hole; and securing the fastener within the first hole with the anchor.

2. The method of claim 1 wherein the drill guide comprises a guide magnet.

3. The method of claim 1 wherein the target magnet is oriented with its north-south axis substantially parallel with the first direction.

4. The method of claim 1 wherein the fastener comprises an anchor hole; and wherein the fastener is secured by inserting the anchor into the anchor hole.

5. The method of claim 1 wherein the first hole is drilled in the first workpiece by passing a drill bit through the second workpiece and into the first workpiece.

6. The method of claim 1 wherein the first workpiece comprises a rib for an aircraft wing.

7. The method of claim 1 wherein the second workpiece comprises a skin for an aircraft wing.

8. The method of claim 1 wherein the target magnet is placed in the first hole by passing it through the second workpiece.

9. The method of claim 1 wherein the target magnet is provided on the shaft of a target pin; and wherein the target magnet is placed in the first hole by passing the shaft of the target pin through the second workpiece and into the first hole until a head of the target pin engages the second workpiece.

* * * * *